(12) United States Patent
Ambrosi (10) Patent No.: US 11,760,568 B2
(45) Date of Patent: Sep. 19, 2023

(54) MODULAR AUTOMATIC WAREHOUSE FOR STORING INDUSTRIAL PRODUCTS

(71) Applicant: TOR.MEC AMBROSI S.R.L., Santa Maria di Zevio (IT)

(72) Inventor: Thomas Ambrosi, Santa Maria di Zevio (IT)

(73) Assignee: AMBROSI S.R.L., San Giovanni Lupatoto (IT)

( * ) Notice: Subject to any disclaimer, the term of this patent is extended or adjusted under 35 U.S.C. 154(b) by 819 days.

(21) Appl. No.: 16/481,419

(22) PCT Filed: Jan. 25, 2018

(86) PCT No.: PCT/IB2018/050439
§ 371 (c)(1),
(2) Date: Jul. 26, 2019

(87) PCT Pub. No.: WO2018/142241
PCT Pub. Date: Aug. 9, 2018

(65) Prior Publication Data
US 2020/0039743 A1    Feb. 6, 2020

(30) Foreign Application Priority Data
Jan. 31, 2017   (IT) ........................ 102017000010427

(51) Int. Cl.
*B65G 1/04*    (2006.01)
*B65G 13/02*   (2006.01)
*B65G 43/10*   (2006.01)

(52) U.S. Cl.
CPC .............. *B65G 1/04* (2013.01); *B65G 13/02* (2013.01); *B65G 43/10* (2013.01);
(Continued)

(58) Field of Classification Search
CPC .......... B65G 1/04; B65G 13/02; B65G 43/10; B65G 2207/30; B65G 2209/00; B65G 2811/098
See application file for complete search history.

(56) References Cited

U.S. PATENT DOCUMENTS 5,599,154 A    2/1997  Hoelscher et al.
7,210,889 B2 *  5/2007  McFarland ............ B65G 1/127
                                                     414/331.02
(Continued)

FOREIGN PATENT DOCUMENTS

DE       69208673 T2    10/1996
DE       20105582 U1     8/2002
(Continued)

OTHER PUBLICATIONS

Iwamaru Y, Medical Parts Recycling System, Sep. 22, 2004, JP 3567215 B2 (Year: 2004).*
(Continued)

*Primary Examiner* — Gene O Crawford
*Assistant Examiner* — Lester Ill Rushin
(74) *Attorney, Agent, or Firm* — Orbit IP LLP (57) ABSTRACT

A modular automatic warehouse comprising at least one module having a parallelepiped shape delimited by respective vertical uprights is provided. The module comprises a first and a second element, each element comprising a plurality of substantially horizontal seats or guides defined by structural flanks for the introduction and/or extraction of a respective plurality of shelves or drawers adapted to contain articles to be stored. The first and second elements being opposite to each other and separated by a compartment inside which at least one lift operates. The lift is able to translate from a lowered position to a raised position in order to move to a location of the drawers. The warehouse may further comprise a means for translating at least one at
(Continued)

a time of the drawers towards further similar adjacent modules in turn provided with a means for translating the drawers to be displaced. Further, the means for translating acts inside the compartment which is open at least in the translation direction from one module to the other.

11 Claims, 11 Drawing Sheets

(52) U.S. Cl.
CPC ...... *B65G 2207/30* (2013.01); *B65G 2209/00* (2013.01); *B65G 2811/098* (2013.01)

(56) References Cited

U.S. PATENT DOCUMENTS

| | | | |
|---|---|---|---|
| 8,751,035 B2 * | 6/2014 | Janet | G07F 9/002 |
| | | | 700/229 |
| 8,876,454 B2 * | 11/2014 | Koholka | B65G 1/1378 |
| | | | 414/277 |
| 2004/0099188 A1 | 5/2004 | Bouche et al. | |

FOREIGN PATENT DOCUMENTS

| | | |
|---|---|---|
| DE | 20306656 U1 | 7/2003 |
| DE | 202004012021 U1 | 12/2005 |
| DE | 202006016133 U1 | 12/2006 |
| DE | 202006003068 U1 | 7/2007 |
| EP | 1462392 A2 | 9/2004 |
| EP | 1466846 A2 | 10/2004 |
| EP | 1813556 A1 | 8/2007 |
| WO | WO01/27002 A1 | 4/2001 |
| WO | WO-0127002 A1 * | 4/2001 ........... B65G 1/0485 |

OTHER PUBLICATIONS

Gilomen L, Method For Storing Or Retrieving Warehouse Goods In Or From Warehousing Device; Involves Bringing At Least One Warehouse Goods Carrier Into Loading Or Unloading Position In Bottom Of Transport Shaft, Apr. 10, 2001, WO-0127002-A1 (Year: 2001).*

Leon Moyano Rafael, Modular Storage System With Movable Rack, Specially Applicable To Motor Vehicles, Sep. 6, 1996, CA 2188939 A1 (Year: 1996).*

御手洗 忠,Deformed Article Transfer Device, Jul. 15, 2009, Japan JP 4294990 (Year: 2009) (Year: 2009).*

Written Opinion dated Apr. 30, 2018 in connection with PCT/IB2018/050439 filed Jan. 25, 2018.

PCT Search report dated Apr. 30, 2018 in connection with PCT/IB2018/050439 filed Jan. 25, 2018.

* cited by examiner

MODULAR AUTOMATIC WAREHOUSE FOR STORING INDUSTRIAL PRODUCTS

CROSS-REFERENCE TO RELATED APPLICATION

This application is the U.S. national phase of PCT Application No. PCT/IB2018/050439 filed on Jan. 25, 2018, which claims priority to IT Patent Application No. 102017000010427 filed on Jan. 31, 2017, the disclosures of which are incorporated in their entirety by reference herein.

FIELD OF APPLICATION

The present invention relates to a modular automatic warehouse with a vertical arrangement for storing products and articles, typically for industrial use.

More precisely, the invention relates to a modular automatic warehouse comprised of a plurality of storage units with a vertical arrangement, each of which comprises a plurality of shelves in which "drawers" are arranged and slidable on guides, each of which can be individually collected by a movable system control and management unit that allows the filling and collecting of the articles or products contained in each drawer.

The modular automatic warehouse according to the invention intends to solve the problems encountered when using traditional automatic warehouses, i.e. problems deriving from any variation to the number of modules used in dedicated systems that imply a design and construction method and consequent management that is practically impossible to modify.

The present invention is advantageously applied in the sector of warehouse and storage systems for classified goods and/or components with automatic management that can be used in the industrial sector and in line production activities such as assembly and production according to flexible production techniques.

PRIOR ART

In the industrial sector, the use of automatic warehouses for storage is known, i.e. the storage and collecting of industrial products contained inside drawers arranged on various levels that can be inserted or extracted from the respective housings for their use, where required, e.g. for the assembly of articles to be sold or their collection.

In particular, traditional automatic vertical warehouses known up to now comprise at least one warehouse, i.e. a sort of shelf formed by uprights and vertical walls between which a series of overlapping horizontal guides is placed in which respective shelves, or drawers, or ledges are housed, provided to contain the industrial products to be used in the production activity for which they are intended.

The horizontal shelves or drawers are placed on the horizontal guides located at predefined distances on the vertical flanks that rise from a bottom floor finishing in the highest part with a roof that unites them.

Most automatic warehouses known up to now use a technology that allows the various shelves to be moved towards a loading and unloading zone, called a "bay", which allows operators to access the related drawer, such technology being based on horizontal and vertical translation systems that move along storage corridors on various levels.

In particular, said translation systems move along corridors placed frontally to each warehouse unit and in some cases they comprise means for positioning and collecting the components inside the drawers, or in other cases they allow the individual drawers to be collected and to be moved towards the loading/unloading zones.

The prior art is also aware of semi-automatic systems for managing the loading and unloading of the components stored in the warehouse.

These systems which are essentially adapted to facilitate the manual work of the warehouse operators, usually make use of a particular automatic movement and management device that comprises a self-powered shuttle that is located inside the storage corridor.

The shuttle is adapted to move the stored components or the containment drawers inside the individual corridor, thus avoiding the use of a forklift truck which would otherwise require emptying of the corridors below as happens in a normal storage unit, thus making all the lines existing in the warehouse individually available, for collecting or loading.

One of the solutions that envisage the use of a product storage system is the subject matter of patent EP2542485 which intends to solve problems inherent to the stability of known vertical automatic warehouses that suffered from the effect of deformations induced by the load and subsequent loss of alignment necessary for the correct insertion of the drawers or trays.

According to such solution, an automatic management warehouse for storing products is proposed, in which the zone facing the lift is free from connecting beams to the flanks.

In practice, this solution envisages the adoption of a movement system in which each end of the lift frame is slidably coupled by means of wheels with a shaped upright of each warehouse at its respective rolling surface so as to define a transversal movable connection between the opposite flanks of the entire structure, thus preventing the distance between opposite uprights from increasing.

Documents U.S. Pat. No. 559,915, WO 0127002 and DE 202006003068U1 are also known in the prior art, regarding warehouses for storing components or goods that comprise a module having a parallelepiped shape delimited by respective vertical uprights, where said module comprises a plurality of substantially horizontal seats or guides for the introduction and/or extraction of a respective plurality of shelves or drawers adapted to contain articles to be stored.

In these cases the sector for introduction and/or extraction of the drawers is located at one compartment in which a vertically slidable lift operates, arranged on movement means activated by motorisation units able to translate the lift from a lowered position to a raised position in order to move to a location of said drawers.

Such systems require the shelves of the warehouse to be sized also according to the movement systems and devices that will be used creating rigid and fairly inflexible structures especially in the case in which they need to be adjacent to other similar structures, for example in the case of extending the warehouse.

The present invention intends to face and solve the problem which derives from the difficulty and expense, and in some cases even the impossibility, to adapt an existing warehouse to the requirements in terms of number, size and type of warehouses and the related movements that can also vary over time.

In general, having to face these requirements, it is necessary to redesign and re-size the entire structure of the warehouse to allow the use of movement systems that are different from those for which the warehouse was initially conceived, designed and sized.

DESCRIPTION OF THE INVENTION

One of the objects of the present invention consists of the introduction of a new system for moving the loading and unloading units of a modular warehouse adapted to exploit the movement unit itself, that is hence able to obviate the drawbacks highlighted above.

The invention sets out, in particular, to provide a movement system in which a design is not necessary but only an integration of additional standardised components that allow the expansion of the system itself.

Furthermore, the movement system for automatic warehouses according to the invention allows the drawers of the warehouses to be exchanged laterally, hence allowing the free arrangement of the various modules, being able to "design" shapes or fill the space in the desired way.

A very important function of the movement system for automatic warehouses according to the invention is the operating independence of each warehouse; in fact, in the event that transfers of drawers in the system are in progress, the lifts designed for the collection and movement of the internal drawers, which can work in parallel to the transfer activities, increase the operating efficiency.

This is obtained through a movement system for automatic warehouses according to the invention, whose characteristics are described in the main claim.

The dependent claims of the present solution delineate advantageous embodiments of the invention.

The main advantages of this solution relate to the possibility to use warehouses that can remain single or be connected in a modular way to others of the same type, exploiting a modularity concept that allows the gradual growth of the system according to requirements.

A further and consequent advantage offered by the movement system according to the invention relates to the fact that the additional warehouses may not even have loading bays as the drawer with the components required by the operator can reach the latter in a main bay or in the bay where they were requested.

In fact, with the system according to the invention, the operator does not move but the internal transport system of the drawers reaches them wherever they are.

A typical application of this concept regards flexible production lines where, with respect for the production system, waste is prevented, connected with the movement of operators, the movement of goods with fork lift trucks, and the occupation of surfaces by optimising spaces also vertically.

Unlike other known systems, the warehouse system according to the invention allows the occupation of the volume of the sites where they are installed to be improved.

The system according to the invention optionally allows the visual management to take place through electronic searches and with artificial viewing systems. In fact, the drawers are scanned and photographed so that a code search can be performed either by attributing the code or visually, bringing a view of the drawer in its latest version to the monitor, i.e. the last time it was repositioned in its storage compartment.

According to the invention, it is envisaged that all the electronic apparatus is modular (such as the warehouses) with a cabled connection, obtaining a sort of "plug and play" management. This allows the collection lists to be able to be managed in such a way that all the details requested therein are brought to the operator in various steps without him/her having to move towards other bays.

In this way, the volume can be exploited better and the operator does not need to travel along the corridors of the company "supermarket" or the line of "stand alone" warehouses looking for the necessary components (reduction of human movement) and transport means for transporting the goods (trans-pallet, fork lift trucks) are not required since the requested components arrive directly in the position, or bay, i.e. loading and unloading zone, desired by the operator.

Furthermore, according to the invention it is envisaged that the arrangement of warehouses can be designed so as to fill the plan space as best as possible, generating free shapes with respect for the interfacing positions, or generating the almost complete filling of the available space, creating storage volumes by the continuous addition of modules, thus optimising the occupied surface area.

According to the invention, the possibility is also envisaged of realising a blind warehouse, i.e. warehouses that can be incorporated or surrounded by other warehouses. This implies a reduction in the costs thereof since it is also possible to rationalise the use of the closing panels, which in this case are no longer necessary.

ILLUSTRATION OF THE DRAWINGS

Further characteristics and advantages of the invention will be evident from reading the following description of an embodiment of the invention by way of non-limiting example with the aid of the figures illustrated in the appended tables of drawings, in which.

DESCRIPTION OF AN EMBODIMENT OF THE INVENTION

Figure 1:
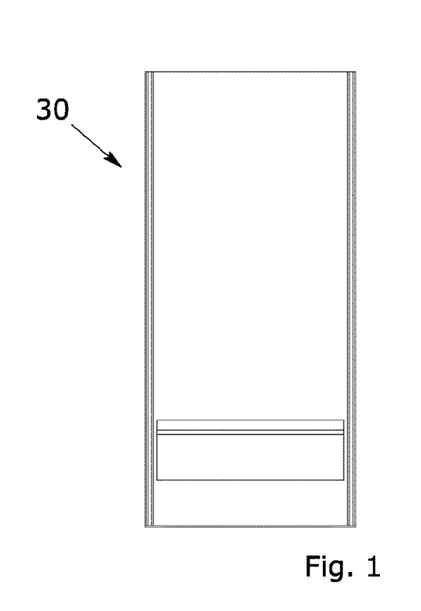
FIGS. 1 and 2 represent two schematic front and perspective views, respectively, of an individual warehouse module which, together with other individual modules, is used in the warehouse system according to the invention.
Figure 2:
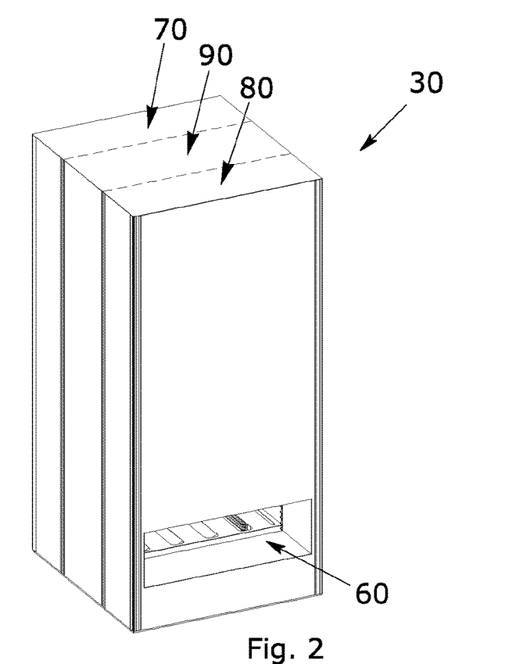

With reference to the appended figures, and initially in particular to FIGS. 1 and 2, number 30 generally indicates an individual simple vertical warehouse module that has a parallelepiped shape with a vertical arrangement comprising four flanks, opposite to each other two by two, supported by respective vertical uprights, that rise starting from a lower support surface.

Figure 3:
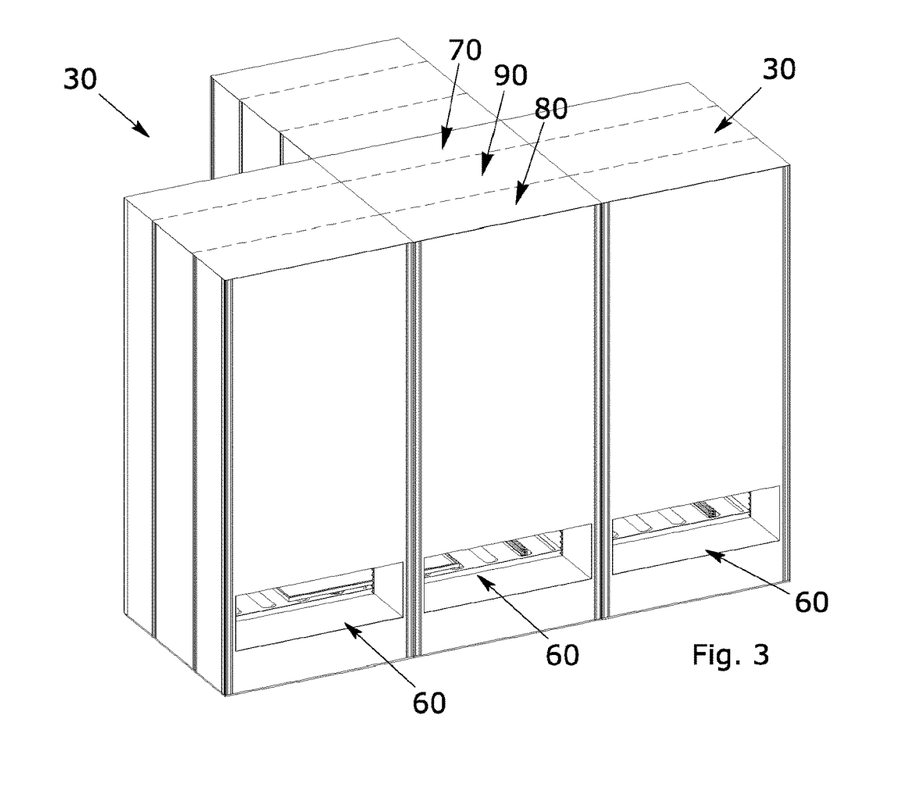
FIG. 3 is a perspective view exemplifying a vertical multiple warehouse module combined according to the invention, which can be connected with the adjacent warehouses.
Figure 4:
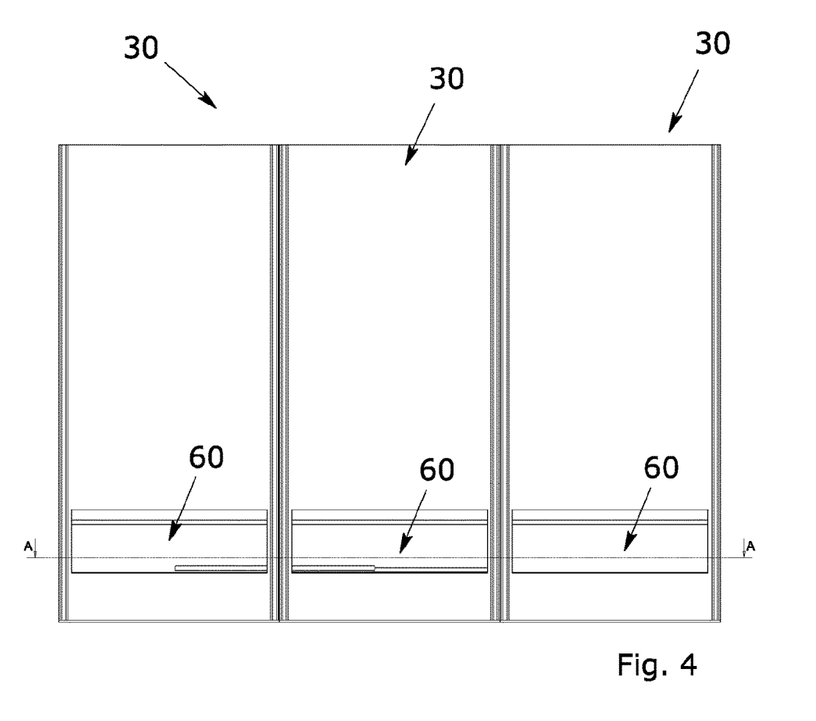
FIG. 4 is a front schematic view of a warehouse with multiple adjacent modules that can be arranged according to any layout and usable as an integrated modular logistic system according to the invention.
Figure 5:
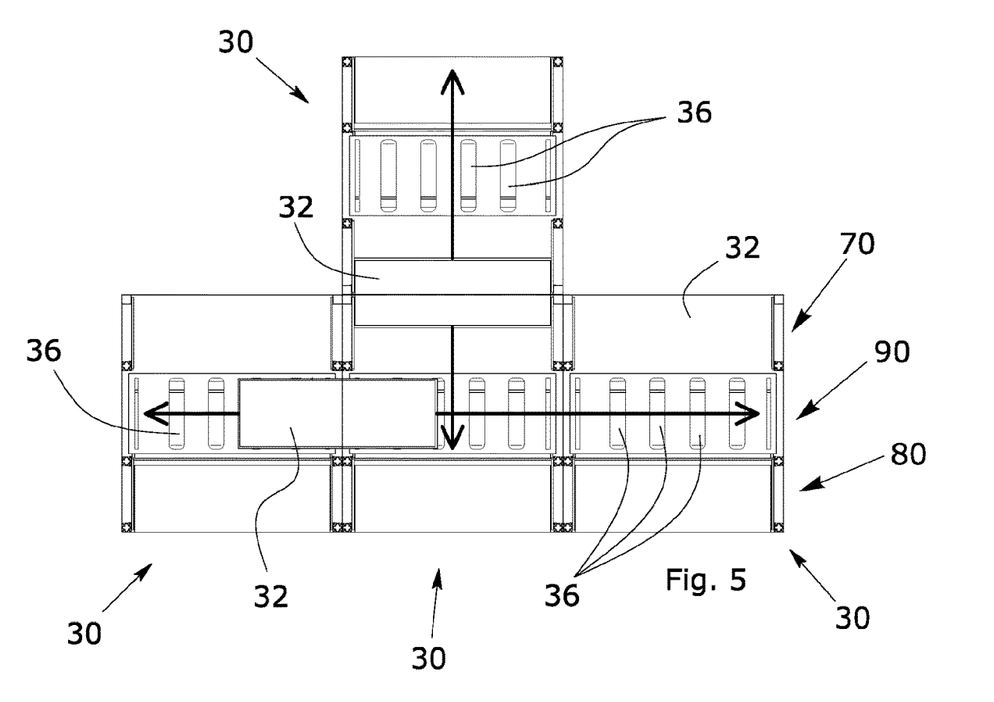
FIG. 5 represents a schematic plan view thereof.

With reference to FIG. 3 it is envisaged that, according to the invention, an individual vertical warehouse module 30 can be flanked to other individual adjacent warehouses, forming a network of warehouses with which it is possible, through internal exchange modules, to move the drawers in any warehouse.

In particular, inside the warehouse 30 a component can be collected that may be managed from any work station and not necessarily from the warehouse where it is contained.

Figures 6, 7, 8:
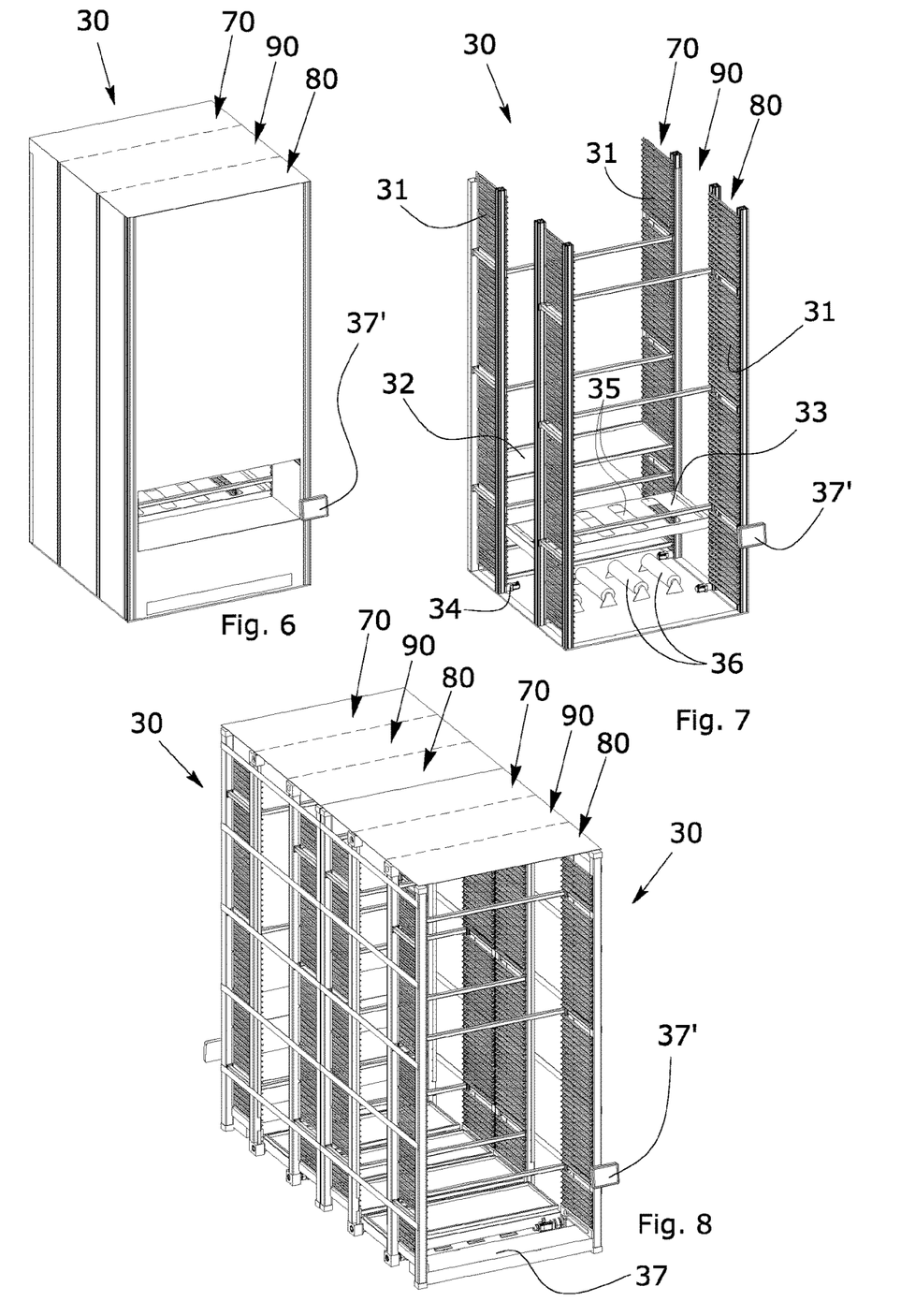
FIGS. 6 and 7 illustrate further schematic, perspective and partially exploded views of a warehouse module affected by the modular management system according to the invention.
FIG. 8 is a perspective, partially exploded view of a pair of adjacent warehouses in which the exchange of the drawers takes place along the frontal plane through exchange devices.
Figure 9:
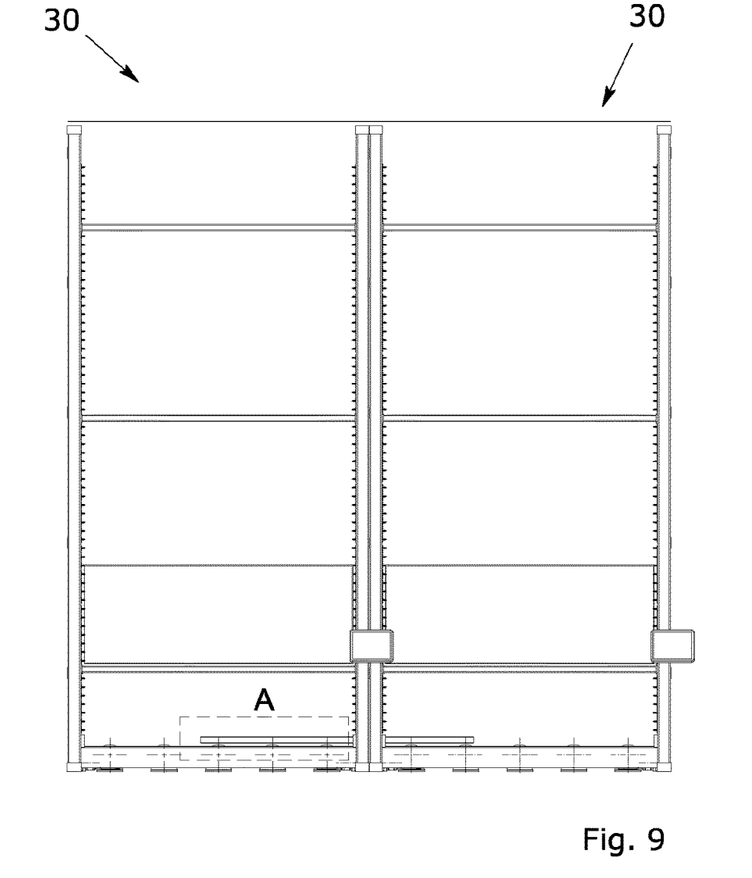
FIGS. 9 and 10 represent schematic, front and detailed views highlighting the method for raising a drawer for lateral exchanges of the lift in the ground position for the exchange method.
Figure 10:
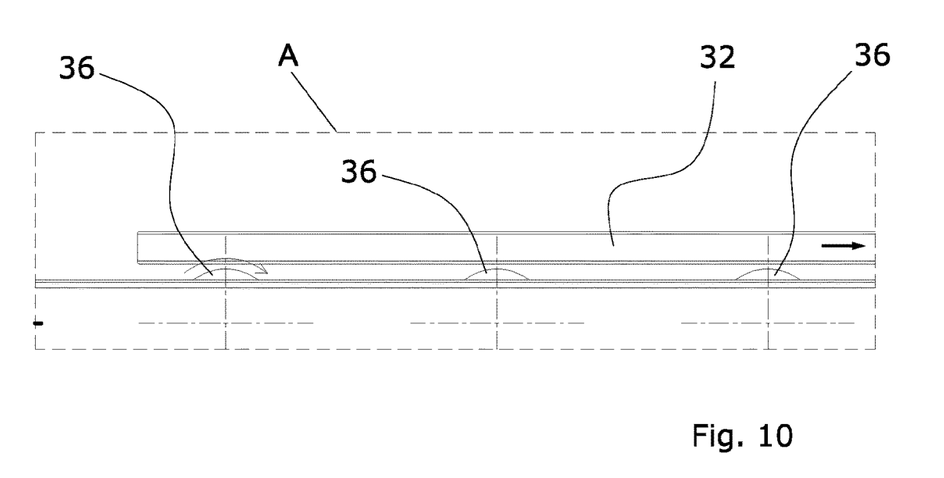

With reference to FIG. 7, each warehouse 30 therefore comprises a first element 70 consisting of a plurality of substantially horizontal seats or guides, comprised between structural flanks 31 with a vertical arrangement, for the introduction, in the horizontal direction, of a plurality of shelves or drawers 32 adapted to contain products or articles to be stored, and a second element 80 also consisting of a plurality of substantially horizontal seats or guides, comprised between structural flanks 31 with a vertical arrangement, for the introduction, in the horizontal direction, of a further plurality of shelves or drawers 32 adapted to contain products or articles to be stored.

Between said first element 70 and said second element 80 that face each other, a central space 90 is afforded for the insertion and extraction of the drawers 32, in which at least one lift 33 operates through vertical displacement, being arranged on four pulley belts or chains, also having a vertical arrangement and activated by means of motorisation units 34 arranged in the internal central sector of the respective structural flanks 31, able to translate the lift itself from a lowered position at ground level to a raised position in proximity to the upper closing shelf.

Alternatively, it is possible to use a plurality of lifts 33, each provided with independent motorised means and activated simultaneously and independently from each other so as to be able to independently compensate for any imbalances of the loads transported.

The four pulley belts or chains that allow the movement of the lift 33 are arranged along the internal vertical edges of each structural flank 31 for supporting drawers 32, i.e. they face towards the central compartment 90 in which the lift shelf 33 itself operates. They travel along the inside of the column that bears the structure, reducing the space occupied by the movement system, hence the space for the lateral transfer of drawers is free.

The lift shelf 33 is also provided with a plurality of openings 35 adapted to be intercepted by a lower exchange device comprising respective rollers 36 which, in use, face the inside of the lift, exceeding its horizontal surface in height.

This arrangement allows the lift 33 to be able to reach each of the drawers 32 that can be collected from its housing, loaded onto the lift and displaced until it reaches the lower level of the module.

In this position, the collected drawer arranged resting on the lift is loaded and can be translated towards the adjacent module since the rollers 36, that enter inside the lift through the openings 35, lift the drawer 32 present at that time and upon a rotation thereof, imparted by relevant motorisation members, determine the translation of the drawer itself towards the same displacement unit being part of the lift 33 present in the adjacent module.

The logistic system according to the present patent has the peculiarity of being able to be used either as an individual automatic vertical warehouse or, by installing more warehouses arranged according to any layout, it can be used as an integrated modular logistic system that can exchange the drawers 32 by means of the exchange lift device 33 with which each warehouse is equipped and that communicates between adjacent warehouses.

Therefore, the operator, by means of an HMI touch screen panel 37' or remotely through another information and attribution or control apparatus, can recall an article present in the warehouse or a drawer 32 from any work station, without necessarily operating from the warehouse where the desired article is physically located.

Therefore, from any warehouse the operator recalls an article and the software system allows the warehouse where the object is located to be activated which, by means of the motorisation 34, takes the lift 33 to the appropriate height, collects the affected drawer 32, and descending to ground level, allows the drawer to be raised from the lift by means of the rollers 36.

Subsequently, the synchronised rotation of the rollers 36 allows the displacement in one direction or the other of the drawer so that it can be displaced laterally towards the adjacent warehouse.

The adjacent warehouse in turn, with the lift in the ground position and rollers turning in synchrony, is able to receive the drawer in the exchange step coming from the adjacent warehouse.

The electronic control and management part is stored inside the electric module 37 placed in the lower part of the loading and unloading zone, or bay 60, and can be managed by a control panel 37' allowing access to the electric panel in all cases of arrangement of the warehouses, passing from the inside or accessing from the loading bay 60, if present.

A system is also provided for weighing the drawers resident on the lift or at a bay that provides information on the weight of the load and on its arrangement on the drawer so that everything can be managed through software to guarantee the efficient and safe arrangement of the loads inside the automatic warehouse.

The system described up to now envisages an exchange of drawers between module and module that must be performed while the lift 33 is necessarily arranged "on the ground" in terms of work height, interacting with the use of rollers 36 that are in fact arranged on the floor.

With respect to this system, further embodiments are also envisaged, the first of which being illustrated in FIGS. 11 to 15, which provides for being able to exchange drawers at any height (not necessarily on the ground) exploiting a lift provided with similar rollers to the previous solution but installed on-board the lift itself, and a second embodiment illustrated in FIGS. 16 to 19 which also envisages being able to exchange the drawers through the lift arranged at any height, therefore not necessarily on the ground, which exploits belts or chains provided with flights.

A further version illustrated in FIGS. 20 to 26 relates to the possibility of exchanging drawers at any level through the use of cogwheels, i.e. using a rack-like system.

In the first case, represented in FIGS. 11 to 15, where the exchange mechanism is obtained through the embodiment with rollers installed on-board, the lift 33 comprises motorised rollers 36' arranged on a support and lifting system consisting of a frame 40 that allows the drawer 32 to be raised.

Figures 11, 12, 13, 14, 15:
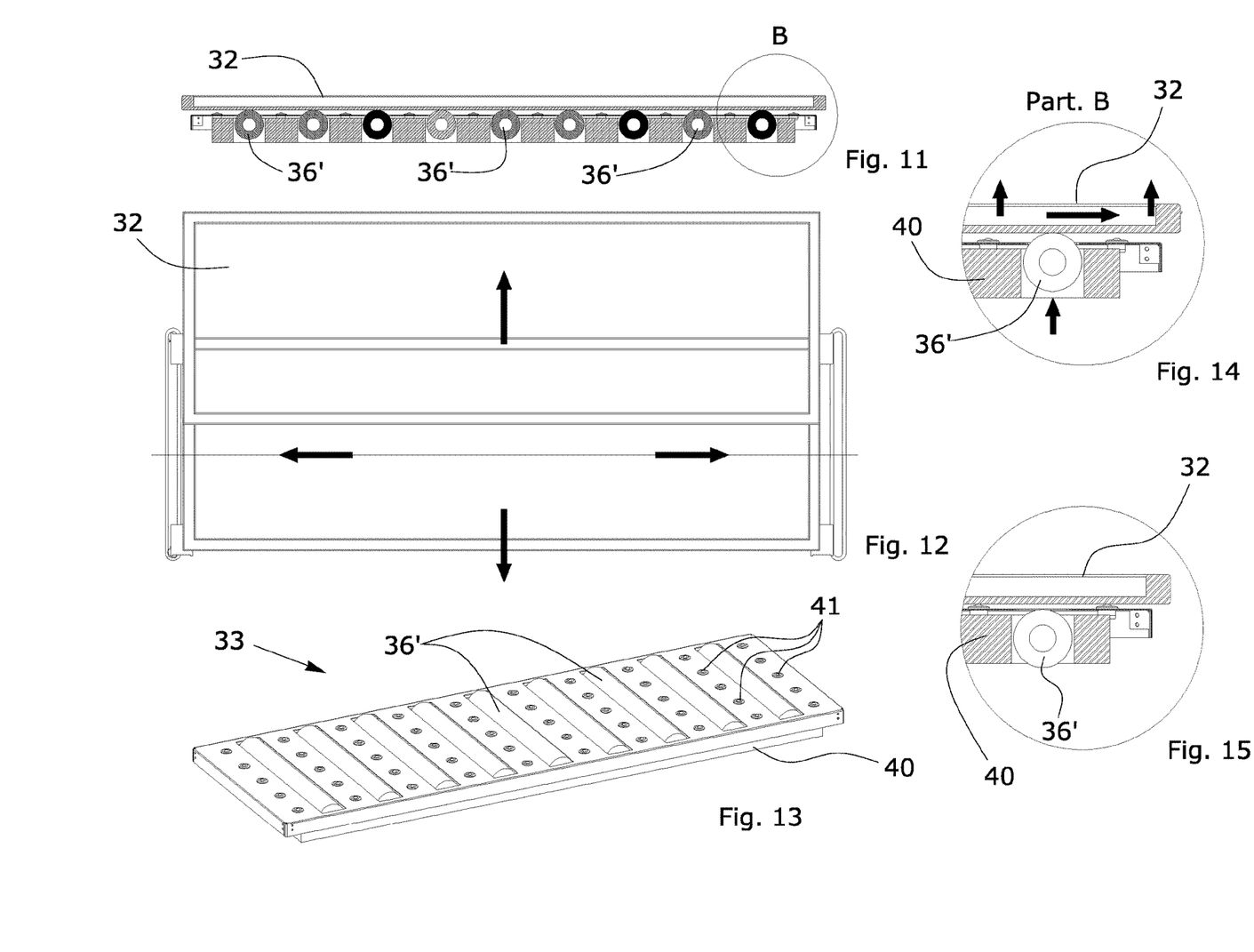
FIGS. 11 to 15 represent schematic, front, plan, perspective and detailed views, respectively, relating to a version of a lift for warehouses according to the invention that envisages being able to exchange drawers laterally at any height and that exploits translation rollers installed on-board the lift itself.

According to this version, as can be seen in FIGS. 14 and 15, the motorised rollers 36' can perform simultaneous displacements along the respective vertical planes through relevant slides, to move from a raised position of engagement with a drawer 32 to a lowered position of disengagement from the drawer itself.

The lifting system of the motorised rollers 36' supported by the frame 40 is realised through the use of electric or hydraulic jacks that allow the displacement of the rollers along the respective slides, or compass or telescopic systems activated with linear movement, or even through eccentric cams which, when placed in rotation, allow the displacement of the rollers.

In the steps in which the rollers 36' are displaced upwards with respect to the frame 40 to keep a drawer 32 with which they are engaged raised, the rotation of the rollers themselves in one direction causes the displacement of the drawer 32 in a lateral direction, whereas a rotation of the rollers in the opposite direction causes the displacement of the drawer 32 towards the opposite direction.

The displacement of the drawer to the front, i.e. orthogonally with respect to the displacement direction imparted by the rollers 36' previously described, is obtained through the use of mechanical drawer collecting means, the drawer remaining sustained by load-bearing spheres 41 which support the drawer 32 itself while the rollers 36' are lowered and in a non-operative condition so as not to interfere during the frontal movement.

In the second case, represented in FIGS. 16 to 19, the exchange mechanism obtained through the second further embodiment uses at least one belt or chain 45 provided with flights 46, installed on-board the lift 33, which belt or chain replaces the rollers 36 of the previous version. The belt or chain 45 is placed between roller pulleys 45' at least one of which being motorised.

Figure 16:
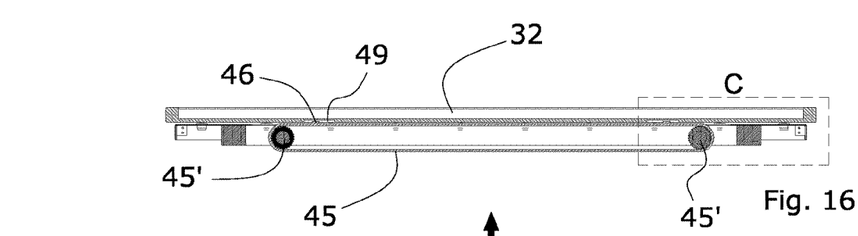
FIGS. 16 to 19 represent schematic, front, plan, perspective and detailed views, respectively, relating to a version of a lift for warehouses according to the invention that envisages being able to exchange drawers laterally at any height using a belt or chain with flights that allow the transport thereof.
Figure 17:
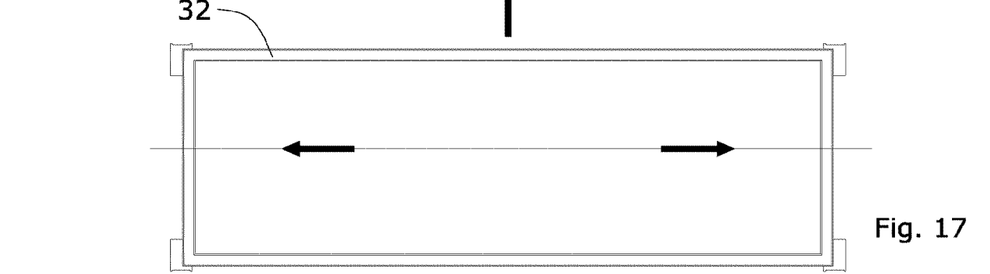
Figure 18:
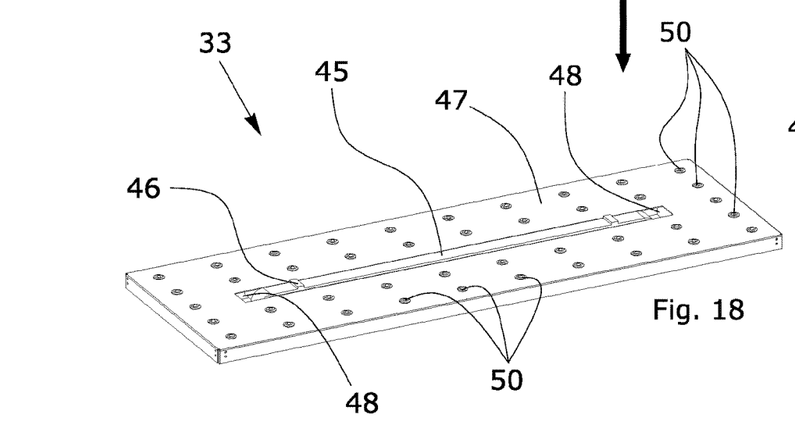
Figure 19:
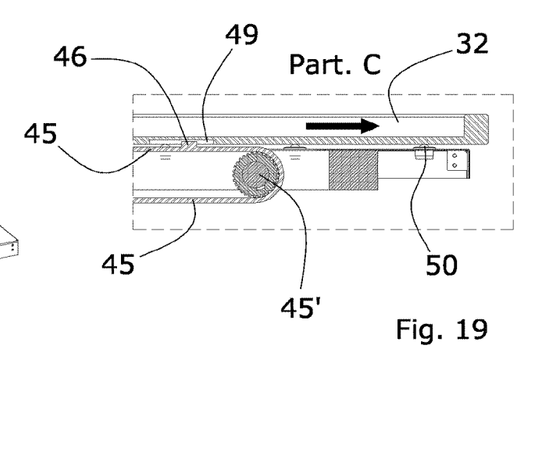
Figure 20:
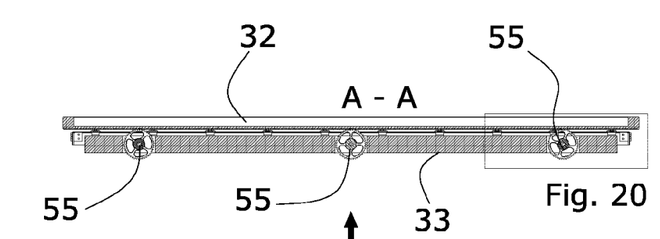
FIGS. 20 to 26 represent schematic, front, plan, perspective and detailed views, respectively, relating to a version of a lift for warehouses according to the invention that envisages the exchange of the drawers laterally at any height using a rack-type system.
Figure 21:
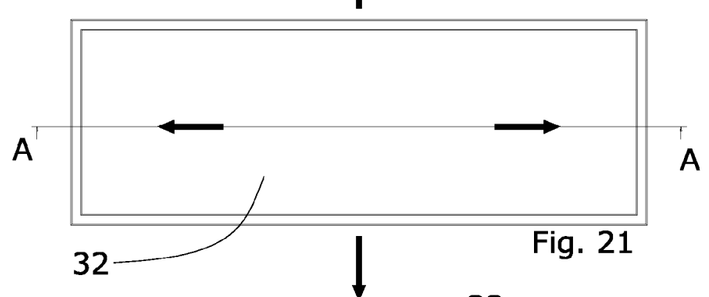
Figure 22:
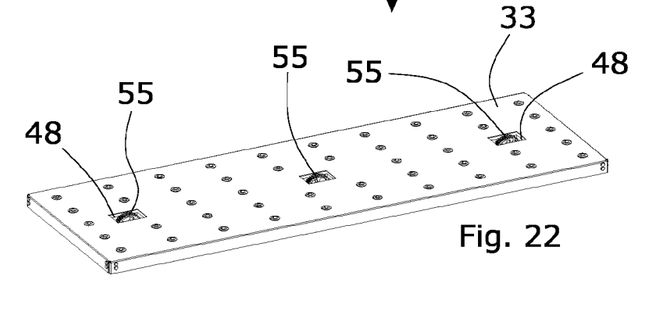

In this case the lift 33 is realised through the use of a shelf 47 provided with at least one slot 48 realised on a median longitudinal axis, in which the belt or chain operates. The flights 46 of said belt 45 project relative to the surface of the shelf 47 so as to interfere with the lower surface of the drawers 32 provided with respective openings 49, as represented in FIG. 16 and in the detail of FIG. 19.

The flights 46 of the belt or chain 45 project from the shelf 47 and are also distanced so as to be introduced, in use, in said openings 49 realised on the bottom of each drawer, so as to enable translation thereof in a lateral direction.

Furthermore, the same shelf 47 is provided with holes from which spheres 50 project, adapted to keep a drawer 32 in a slightly raised condition from the shelf, in order to allow the slipping thereof in two reciprocally orthogonal directions with respect to the lift itself: a first lateral direction imparted by the flights 46 and a second front direction imparted by the drawer collecting means.

According to the invention, a further embodiment is also envisaged, represented in FIGS. 20 to 26, in which the exchange mechanism uses motorised cogwheels 55 installed on-board the lift 33, which replace the rollers 36' and the belt or chain 45 of the previous versions.

Figure 23:
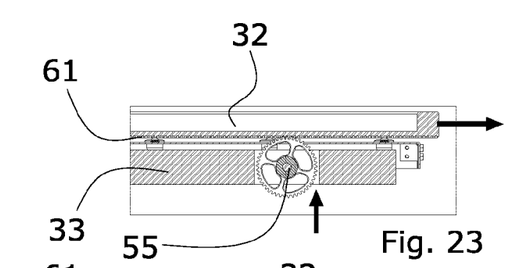
Figure 24:
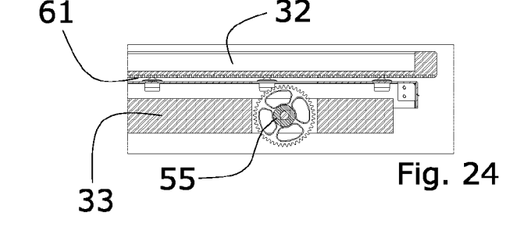
Figures 25, 26:
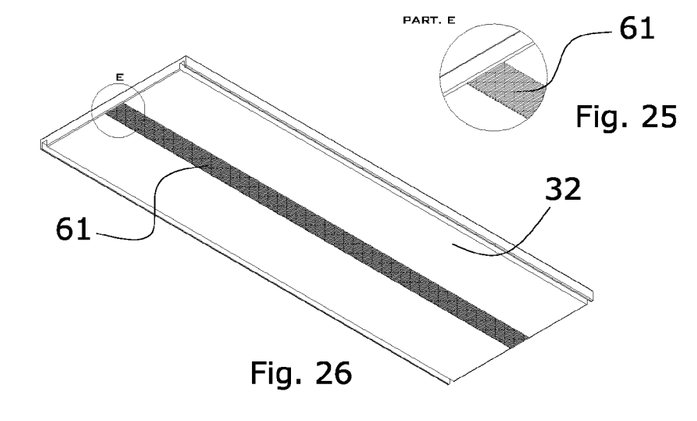
Figure 27:
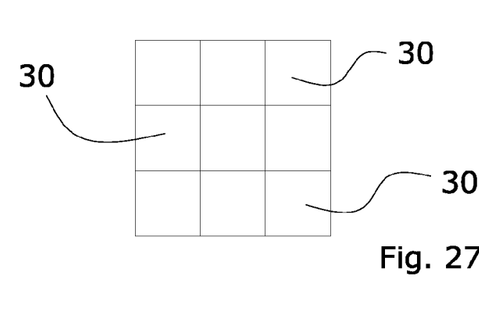
FIGS. 27 to 30 represent schematic views highlighting possible combinations or layouts of warehouses that can assume infinite plan layouts, or with different heights or different locations of the loading bay.
Figure 28:
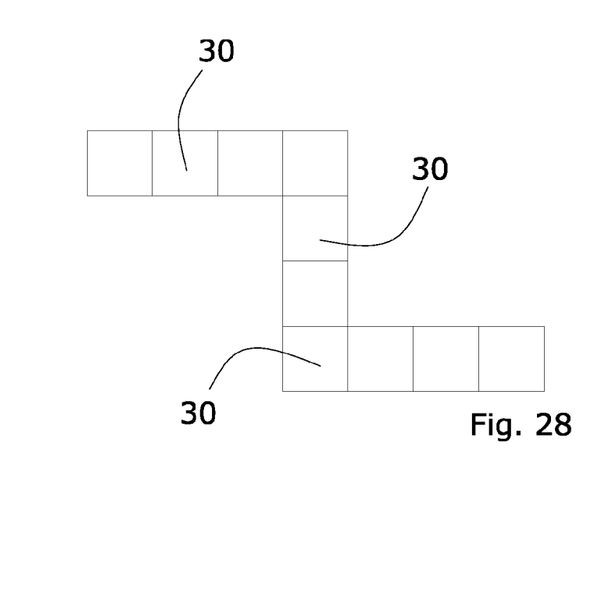
Figure 29:
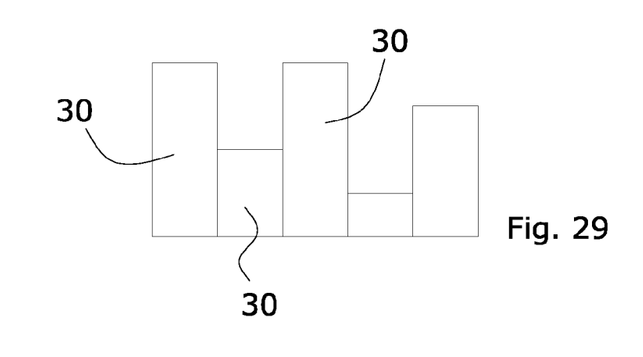
Figure 30:
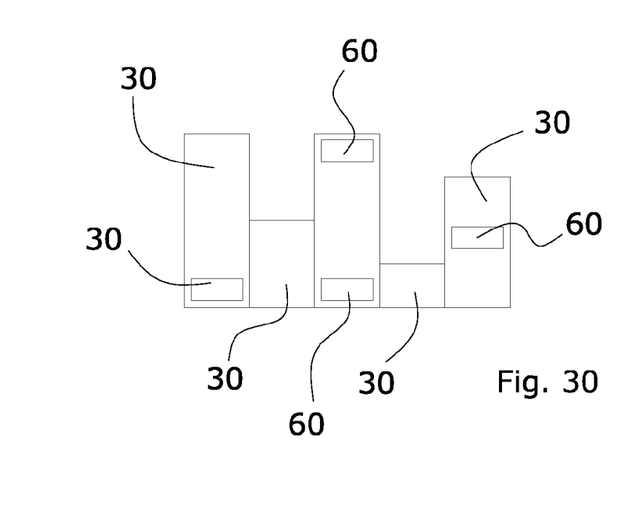
Figure 31:
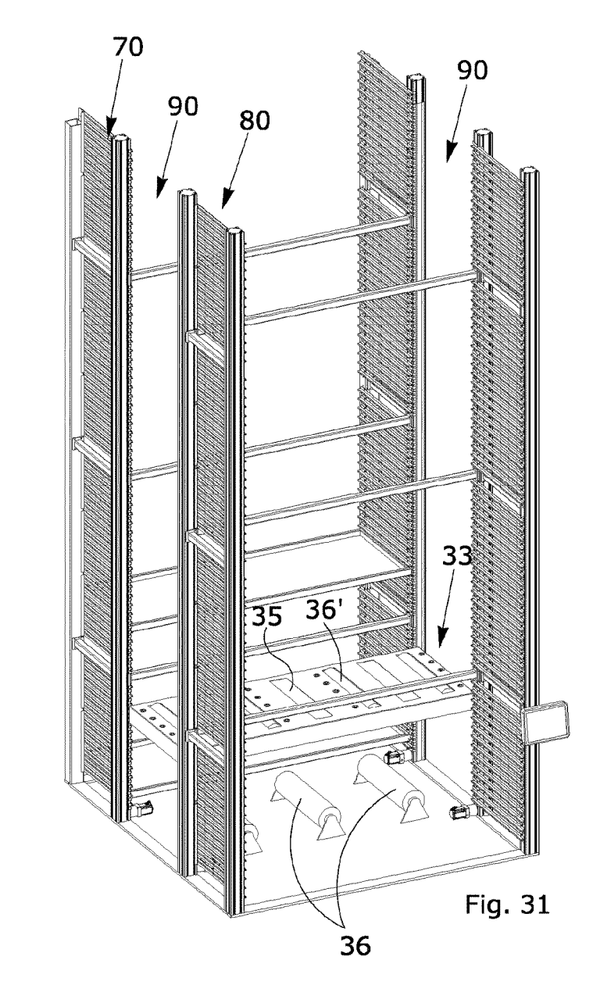
FIGS. 31 to 38 are schematic views relating to an embodiment in which the lift is provided with a multiple translation system.
Figures 32, 33, 34, 35:
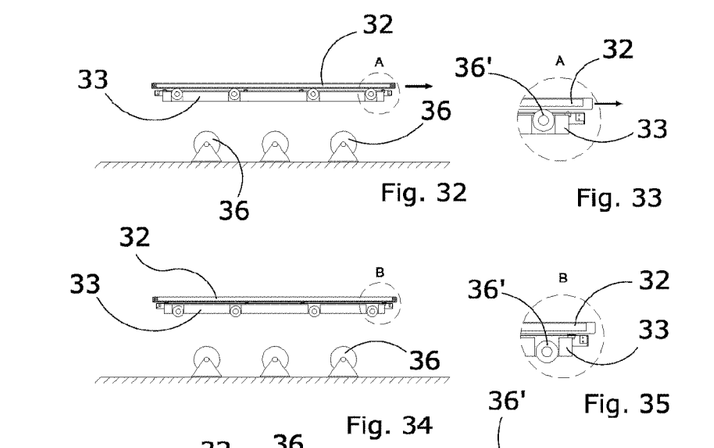
Figures 36, 37, 38:
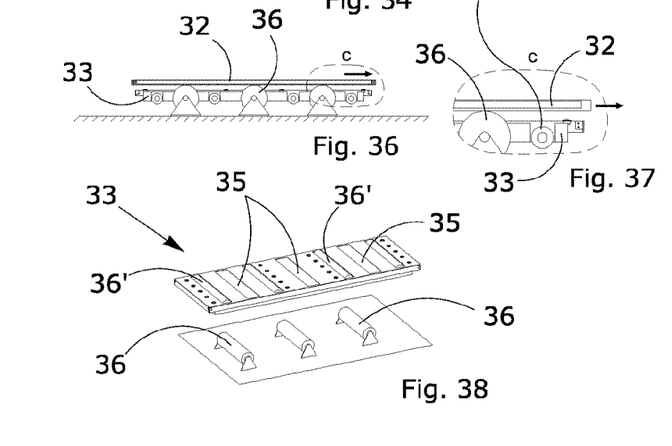

According to this version, as can be seen in FIGS. 23 and 24, the motorised cogwheels 55, like the mentioned rollers 36', can perform simultaneous displacements along a vertical plane to move from a raised position of engagement with a drawer 32, in this case provided with a rack 61, to a lowered position of disengagement from the drawer itself.

The lifting system of the motorised cogwheels 55 supported by the frame 33 is realised through the use of electric or hydraulic jacks or compass or telescopic systems activated with linear movement, or even through eccentric cams which, when placed in rotation, allow the displacement of the motorised cogwheels.

In the steps in which the motorised cogwheels are displaced upwards with respect to the frame of the lift 33 to meet the slots 48 appropriately realised to simulate a rack 61 on the bottom of a drawer 32 with which they are engaged, the rotation of the motorised cogwheels 55 themselves in one direction causes the displacement of the drawer 32 in a lateral direction, whereas a rotation of the motorised cogwheels 55 in the opposite direction causes the displacement of the drawer 32 towards the opposite direction.

Like the previous case, the same shelf 33 is provided with holes from which spheres project, adapted to keep a drawer in a slightly raised condition from the shelf itself, in order to allow the slipping thereof in two reciprocally orthogonal directions with respect to the lift itself: a first lateral direction imparted by the motorised cogwheels 55 and a second front direction imparted by the drawer collecting means while the motorised cogwheels 55 are lowered and in a non-operative condition so as not to interfere on the drawer during the frontal movement (FIG. 24).

In FIGS. 31 to 38 an embodiment is represented in which the lift 33 is of the hybrid type, i.e. it is provided with both a plurality of openings 35 adapted to be intercepted by the aforementioned lower exchange device comprising respective rollers 36 which face the inside of the lift exceeding its horizontal surface in height, and a plurality of movable rollers 36' mounted on-board the lift 33 itself.

This solution envisages that the lift 33 can exchange drawers both on the ground and at any height, since on the ground it can be intercepted by the rollers 36 that cross the openings 35 for displacements on the ground, while for displacements at height the movable rollers 36' are used, which are installed on-board the lift itself for being able to act at any level.

Figure 39:
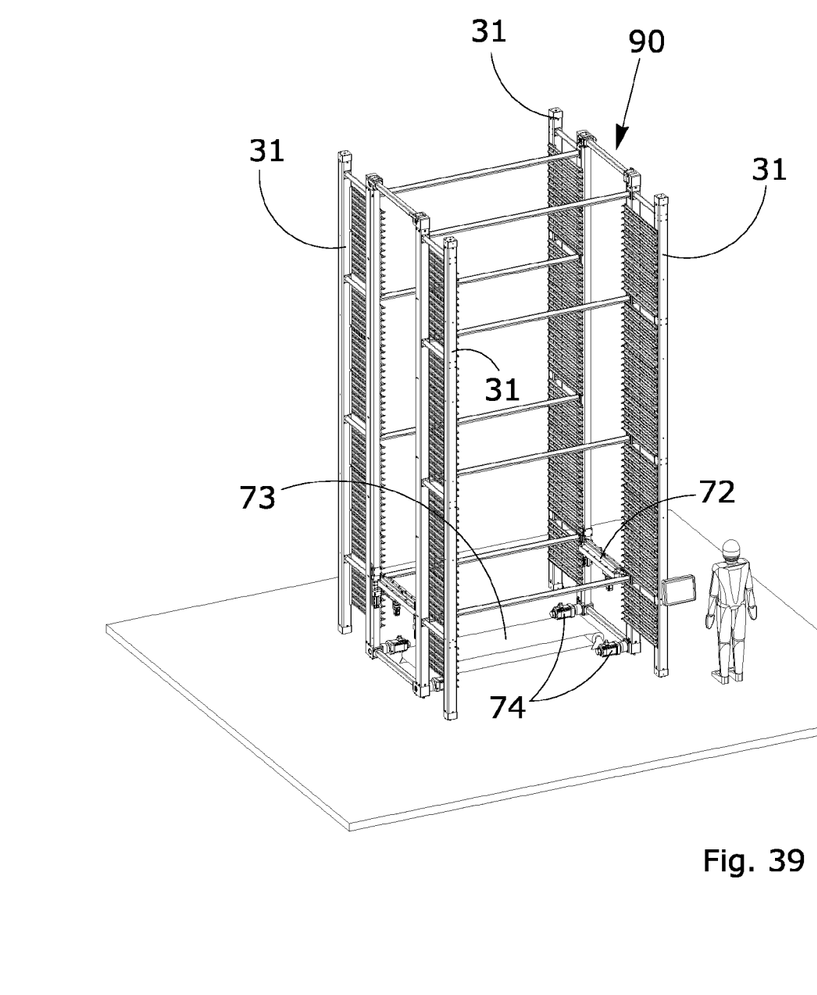
FIGS. 39 to 44 represent schematic views relating to a further embodiment in which the lift is split into a plurality of lifts opposite to each other two by two and activated by independent motors.
Figure 40:
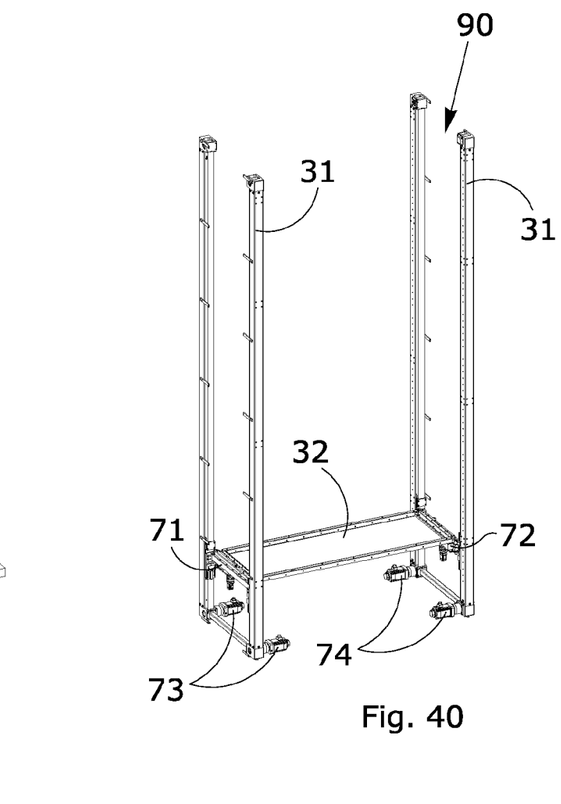
Figure 41:
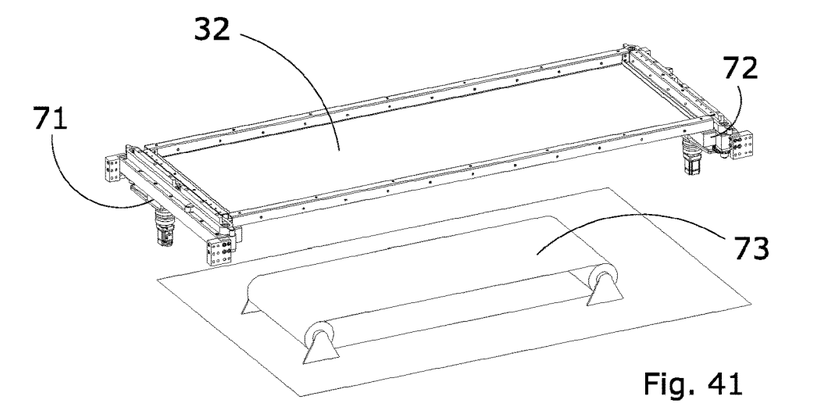

FIGS. 39 to 41 represent a further embodiment in which said lift 33 is split into a plurality of lifts 71 and 72 opposite to each other two by two and activated by pairs of independent motors 73 and 74.

Figure 42:
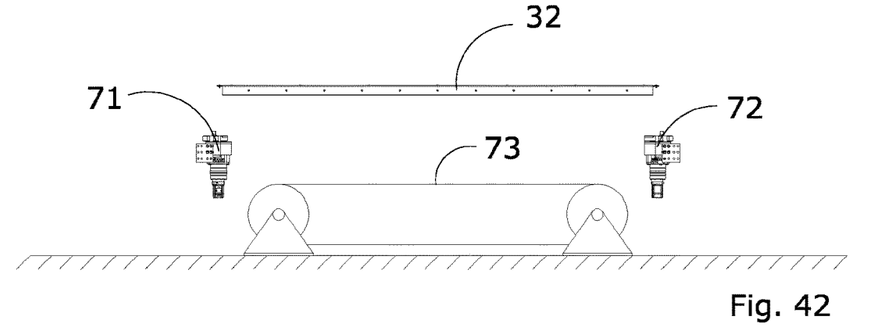
Figure 43:
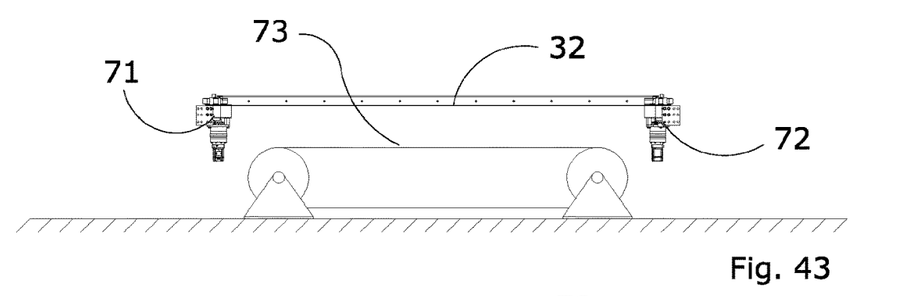
Figure 44:
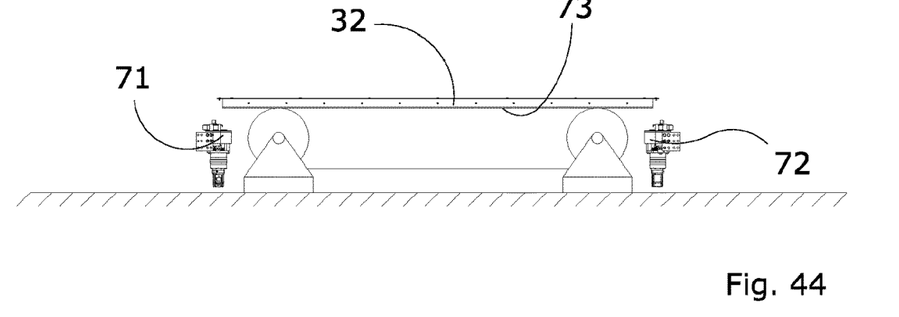

A respective drawer 32 rests on said lifts 71 and 72, which must be moved and remains in suspension while it is retained at the two opposite ends thereof. As represented in FIGS. 42 and 43, the drawer 32 is deconstrained from the two portions 71 and 72 of the lift and can rest thereon during the displacement steps.

In FIG. 39 and from 41 to 44 it can be noted that the drawer 32 cooperates with a conveyor belt 73 located in the lower central part of the module.

Such belt 73 operates so that, when the two portions 71 and 72 of the lift are in the lower part, it intercepts and raises the drawer 32 and upon a rotation thereof, imparted by relevant motorisation members, the translation of the drawer 32 itself is imparted towards the same displacement unit being part of the lift 33 present in the adjacent module.

Each module which, together with other modules, composes the modular warehouse according to the invention, comprises the same devices described above being part of each lift 33 and which, based on the latest movement versions, can be positioned at the same height, by performing appropriated programmed movements in order to receive in synchrony the moving drawer and place it at the centre of the lift so that it can be displaced into the programmed location for the loading or collecting of the components housed therein.

The information system integrated into each of the warehouses envisages a redundancy of databases regarding the whole system (with any limitations if required by the system administrator) so that, in the event of failure of any of the electronic apparatuses on-board one of the warehouses, there is a backup copy of the data. It follows that no external or main server is provided.

The invention has been described in the above with reference to a preferred embodiment thereof. However it is clear that the invention is susceptible to numerous variants which fall within the scope thereof, and which are technically equivalent.

The invention claimed is:

1. A modular automatic warehouse for storing products and articles to be stored, comprising:
   at least one module having a parallelepiped shape and being constituted by two opposed elements having a parallelepiped shape, each element being delimited by respective vertical uprights, said two elements being spaced from each other by a predetermined distance defining a substantially open compartment, each of said opposed elements having a pair of structural sides in the internal part of which a plurality of horizontal seats or guides is defined for supporting a plurality of drawers containing said products and articles to be stored; wherein:
   at least one elevator is positioned inside of said compartment, the at least one elevator being driven vertically by at least one motor for transferring a drawer in correspondence of a pair of horizontal seats or guides of at least one of said two opposed elements;
   a mechanism is provided to transfer horizontally a drawer in a first direction from the at least one elevator to the seats or guides of one of the two opposed elements, or to transfer horizontally in said first direction a drawer from the seats or guides of one of the two opposed elements to the at least one elevator; and
   said at least one elevator is provided with a mechanism configured for transferring horizontally a drawer along a second direction that is orthogonal with said first direction toward and from another elevator belonging to another module positioned adjacent to said at least one module.

2. The modular automatic warehouse of claim 1, wherein said at least one elevator is moved vertically by a pulley mechanism with a vertical arrangement, arranged along the vertical inner edges of each structural side for supporting drawers of said opposed elements, said pulley mechanism comprising belts or chains that are arranged on the four edges of said compartment in which the elevator operates.

3. The modular automatic warehouse of claim 1, wherein said mechanism configured for transferring horizontally a drawer towards and from another adjacent elevator belonging to another adjacent module comprises a plurality of motorized rollers, each of said rollers projecting from an opening of a plurality of openings provided in a lift shelf of the at least one elevator, to allow the translation of the drawer from one elevator to another elevator placed at the same level on an adjacent module.

4. The modular automatic warehouse of claim 1, comprising a plurality of elevators positioned opposite to each other two by two and activated by independent motors.

5. A modular automatic warehouse for storing products and articles to be stored, comprising:
   at least one module having a parallelepiped shape and being constituted by two opposed elements having a parallelepiped shape, each element being delimited by respective vertical uprights, said two elements being spaced from each other by a predetermined distance defining a substantially open compartment, each of said opposed elements having a pair of structural sides in the internal part of which a plurality of horizontal seats or guides is defined for supporting a plurality of drawers containing said products and articles to be stored; wherein:
   at least one elevator is positioned inside of said compartment, the at least one elevator being driven vertically by motors for transferring a drawer in correspondence of a pair of horizontal seats or guides of at least one of said two opposed elements;
   a mechanism is provided to transfer horizontally a drawer in a first direction from the at least one elevator to the seats or guides of one of the two opposed elements, or to transfer horizontally in said first direction a drawer from the seats or guides of one of the two opposed elements to the at least one elevator;
   said at least one elevator is provided with a mechanism configured for transferring horizontally a drawer along a second direction that is orthogonal with said first direction toward and from another elevator belonging to another module positioned adjacent to said at least one module; and
   the mechanism configured for transferring horizontally a drawer towards and from another adjacent elevator belonging to another adjacent module is mounted on-board of a lift shelf of the at least one elevator and comprises a frame inside of which motorized rollers, a belt, a chain, and/or cogwheels are arranged.

6. The modular automatic warehouse of claim 5, wherein the mechanism for transferring horizontally a drawer along a second direction that is orthogonal with respect to the first direction comprises at least one belt or chain provided with flights projecting through at least one slot provided in a lift shelf that is part of the elevator, whereby the flights of said belt or chain project relative to the surface of the lift shelf so as to engage with recesses provided in the lower surface of a drawer.

7. The modular automatic warehouse of claim 6, wherein said lift shelf is provided with holes from which spheres project, which are configured to keep the drawer in a raised condition from the lift shelf itself, in order to allow the slipping thereof in two reciprocally orthogonal directions with respect to the elevator, namely the second lateral direction imparted by the flights and the first direction imparted by a drawer collection mechanism.

8. The modular automatic warehouse of claim 5, wherein said motorized rollers and/or cogwheels are arranged on slides which enable simultaneous displacements to be carried out in order to move from a raised position of engagement with a drawer to a lowered position of disengagement from the drawer itself and vice versa.

9. A modular automatic warehouse for storing products and articles to be stored, comprising:
- at least one module having a parallelepiped shape and being constituted by two opposed elements having a parallelepiped shape, each element being delimited by respective vertical uprights, said two elements being spaced from each other by a predetermined distance defining a substantially open compartment, each of said opposed elements having a pair of structural sides in the internal part of which a plurality of horizontal seats or guides is defined for supporting a plurality of drawers containing said products and articles to be stored; wherein:
- at least one elevator is positioned inside of said compartment, the at least one elevator being driven vertically by motors for transferring a drawer in correspondence of a pair of horizontal seats or guides of at least one of said two opposed elements;
- a mechanism is provided to transfer horizontally a drawer in a first direction from the at least one elevator to the seats or guides of one of the two opposed elements, or to transfer horizontally in said first direction a drawer from the seats or guides of one of the two opposed elements to the at least one elevator;
- said at least one elevator is provided with a mechanism configured for transferring horizontally a drawer along a second direction that is orthogonal with said first direction toward and from another elevator belonging to another module positioned adjacent to said at least one module;
- said mechanism configured for transferring horizontally a drawer towards and from another adjacent elevator belonging to another adjacent module comprises a plurality of motorized rollers, each of said rollers projecting from an opening of a plurality of openings provided in a lift shelf of the at least one elevator, to allow the translation of the drawer from one elevator to another elevator placed at the same level on an adjacent module; and
- the mechanism to transfer horizontally a drawer in a first direction from the at least one elevator to the seats or guides of one of the two opposed elements, or to transfer horizontally in said first direction a drawer from the seats or guides of one of the two opposed elements to the at least one elevator comprises a drawer collection mechanism, and wherein the elevator further comprises load bearing spherical elements that project through openings in the lift shelf and which are configured to support a drawer in free movement for being displaced inside and/or outside of the seats or guides while the rollers are in a non-operative condition.

10. A modular automatic warehouse for storing products and articles to be stored, comprising:
- at least one module having a parallelepiped shape and being constituted by two opposed elements having a parallelepiped shape, each element being delimited by respective vertical uprights, said two elements being spaced from each other by a predetermined distance defining a substantially open compartment, each of said opposed elements having a pair of structural sides in the internal part of which a plurality of horizontal seats or guides is defined for supporting a plurality of drawers containing said products and articles to be stored; wherein:
- at least one elevator is positioned inside of said compartment, the at least one elevator being driven vertically by motors for transferring a drawer in correspondence of a pair of horizontal seats or guides of at least one of said two opposed elements;
- a mechanism is provided to transfer horizontally a drawer in a first direction from the at least one elevator to the seats or guides of one of the two opposed elements, or to transfer horizontally in said first direction a drawer from the seats or guides of one of the two opposed elements to the at least one elevator;
- said at least one elevator is provided with a mechanism configured for transferring horizontally a drawer along a second direction that is orthogonal with said first direction toward and from another elevator belonging to another module positioned adjacent to said at least one module; and
- the at least one elevator comprises a lift shelf provided with both a plurality of openings adapted to be intercepted by an exchange device comprising respective rollers which face the inside of the elevator and that exceed the horizontal surface of the lift shelf in height when the elevator is lowered, and a plurality of movable rollers mounted on-board the elevator.

11. A modular automatic warehouse for storing products and articles to be stored, said warehouse, comprising:
- at least one module, said at least one module comprising two opposed elements having a parallelepiped shape, each element being delimited by respective vertical uprights, each of said opposed elements having a pair of structural sides defining a plurality of substantially horizontal seats or guides for the introduction and/or extraction of a respective plurality of shelves or drawers adapted to contain said articles to be stored; wherein
- said opposed elements are separated by a compartment inside of which at least one lift operates,
- the lift being vertically slidable and arranged on movement means activated by motorization units able to translate said at least one lift from a lowered position to a raised position in order to move to a location of said drawers;
- the at least one module has a parallelepiped shape delimited by said vertical uprights; and
- said at least one module further comprises a means for translating at least one at a time of said drawers towards further similar adjacent modules in turn provided with a means for translating the drawers to be displaced, and wherein said means acts inside said compartment which is open at least in the translation direction from one module to the other module.

* * * * *